United States Patent
Mombo Caristan

[11] Patent Number: 5,848,091
[45] Date of Patent: Dec. 8, 1998

[54] LASER RESONATOR WITH IMPROVED OUTPUT BEAM CHARACTERISTICS

[75] Inventor: Jean-Charles L. Mombo Caristan, Troy, Mich.

[73] Assignee: The Twentyfirst Century Corp., Detroit, Mich.

[21] Appl. No.: 786,676

[22] Filed: Jan. 21, 1997

[51] Int. Cl.$^6$ .................................................. H01S 3/09
[52] U.S. Cl. ............................ 372/103; 372/95; 372/92; 372/99; 219/121.63
[58] Field of Search .......................... 372/103, 95, 92, 372/108, 98, 99; 219/121.63

[56] References Cited

U.S. PATENT DOCUMENTS

| | | | |
|---|---|---|---|
| 4,939,738 | 7/1990 | Opower | 372/95 |
| 5,048,048 | 9/1991 | Nishimae et al. | 372/95 |
| 5,125,001 | 6/1992 | Yagi et al. | 372/95 |
| 5,373,528 | 12/1994 | Kuzumoto et al. | 372/87 |
| 5,392,309 | 2/1995 | Nishimae et al. | 372/95 |
| 5,412,681 | 5/1995 | Eisel et al. | 372/95 |
| 5,528,619 | 6/1996 | Bochum et al. | 372/95 |

OTHER PUBLICATIONS

Borghese et al., "Unstable–Stabel Resonators with Toroidal Mirrors" Applied Optics, vol. 20, No. 20, pp. 3547–3552, Oct. 15, 1982.
John Macken, "DC Slab CO2 Lasers", Proceedings of LAMP '92, pp. 67–72, Nagaoka, Japan, Jun. 1992.

*Primary Examiner*—Leon Scott, Jr.

[57] ABSTRACT

A high power laser resonator with improved efficiency of the lasing mechanism, for outputting a laser beam (6) of improved geometric and quality factors characteristics, adapted to the specific needs of high-speed-high-power laser material processing. In particular, conditions for output laser beam (6) geometric dimensions Dx, Dy, and corresponding quality factors, Kx, Ky, are set, such that the laser beam could be usable directly from the output of the resonator without adding beam shaping optics, and such that a better optimization of the extraction efficiency of laser power can be achieved. These four factors are in specific relationship with the wavelength of the laser radiation and the output laser power.

19 Claims, 4 Drawing Sheets

LASER RESONATOR WITH IMPROVED OUTPUT BEAM CHARACTERISTICS

FIELD OF THE INVENTION

This invention relates to a high power laser resonator with improved efficiency of the lasing mechanism, for outputting a beam of better geometric and divergence characteristics, adapted to the specific needs of high-speed-high-power laser material processing.

BACKGROUND OF THE INVENTION

Commercially available multi-kilowatt industrial lasers are composed of an active medium (gas as in CO2 lasers, solid as in YAG lasers, etc.), a pumping mechanism (DC electric discharge, or radio-frequency excitation, or flash lamp excitation or other) in charge of pumping, or exciting the molecules and atoms of the active medium to higher quantum energy levels, and a resonator cavity composed of end-mirrors between which the atoms and molecules of the active medium lie, excited, i.e. pumped, by the pumping mechanism, and between which stimulated emission of radiation from the active medium is initiated, and amplified by back and forth reflections traveling through the active medium.

In most stable resonators, one mirror, called the output coupler mirror, is partially transmissive. The transmitted part of the stimulated emission of radiation constitutes the usable output laser beam. In most unstable resonators, part of the stimulated emission of radiation is not reflected back in the resonator cavity, partly because of diffraction losses, and constitutes the usable output laser beam. Certain hybrid laser resonators are considered stable in one transverse direction and unstable in another transverse direction.

For laser material processing such as cutting, welding and drilling, it has been the tradition to require a circular laser beam, in particular of beam quality factor K as close to 1 as possible. This requirement is explained by the aim of focusing the laser beam into the smallest uniformly circular spot possible in order to enhance power density and thus enhance processing speed for higher productivity. The quality factor K of the laser beam gives a proportional measure of the divergence of the laser beam. K, sometimes called in the literature $M^2$ or $1/k$ factor, is always larger than or equal to 1. In reality most active medium zones excited by the pumping mechanism, do not necessarily have a circular cross section. Indeed, the pumped active medium zone presents a non circular cross section, that can be square, rectangular, or of other non-circular shape. In order to achieve this axissymetric output laser beam, most resonators are designed such that the laser beam is forced to be circular at the output by using circular aperture mirrors, or eventually circular masks, or circular active medium enclosures or a circular active medium itself. The circular laser beam cross section can then be significantly smaller than the usable pumped active medium zone, thus substantially limiting the energy extraction efficiency of the laser resonator.

Some laser resonators such as the one described in the article by John Macken "DC Slab CO2 Lasers, Proceedings of LAMP 92, Nagaoka, Japan, PP-67–72" have a rectangular output laser beam. This type of Slab CO2 laser beams is characterized by a high aspect ratio R (length divided by width of the rectangle) of more than about 4, with the width being small (less than about 5 mm) in order to enable adequate diffusion cooling of the active medium. Consequently, these lasers are limited to an average output power of about 3 kW with the current technology. Such a rectangular output beam is not directly usable for most laser material processing and requires a beam shaping unit that converts the rectangular output into a square beam or sometimes a generally circular TEM00 mode.

U.S. Pat. Nos. 4,939,738 and number 5,373,528 and the article by A. Borghese et al. entitled "Unstable-Stable Resonators with Toroidal Mirrors", published in Applied Optics, Vol. 20, Oct. 1981, also describe lasers with rectangular output beam. However, these laser beams are not usable without additional beam shaping optics, particularly for High-Speed-High-Power laser welding. Indeed, the specification on the aspect ratio, defined as being the ratio of the geometrical length by the geometrical width of the laser beam's cross-section, turns out not to be enough by itself to define the focusability to the adequate spot dimensions. The possible difference in quality factors in the two transverse directions must be equally carefully designed in order to make the laser beam usable for HSHP keyhole laser welding with standard focusing elements such as parabolic mirrors.

However, good focusability depends among other parameters on the quality factors. The larger the quality factor, the worse the focusability. Most laser manufacturers have been seeking the best compromise between small quality factor of laser beams for good focusability and large geometric dimension of laser beams for increased average output power. In some industrial lasers, a reduction of the beam diameter by about ½, with an appropriate mask aperture in the resonator cavity, can yield a reduction of the quality factor K by about ¼, however, the average output power is also reduced by about ½, and the energy extraction efficiency is worsened proportionally. In HSHP laser welding, it is established in the welding method disclosed in U.S. patent application Ser. No. 08/395,480, filed on Mar. 12, 1995, that good focusability is not as strong a requirement in the direction of welding as it is in the direction perpendicular to the welding direction.

Additional beam shaping optics apparatus presents the inconvenience of adding costs, adding maintenance and optics alignment requirements, and consequently reduces the usable laser power at the workpiece because of partial power absorption and aberration losses on each of the optics of the beam shaping apparatus. Moreover, for all presently commercially available multikilowatt lasers, it is believed that the lasing mechanism efficiency is limited by the commonly accepted requirement of keeping quality factors as small as possible and as isotropic, i.e. uniform in all transverse directions, as possible.

Prior art high power industrial lasers seek minimum quality factors in all directions for better focusability, whenever possible, or at least isotropic quality factors, i.e. equal quality factors in all directions, such as in a Gaussian beam. As good focusability is not required in the welding direction, the minimization and uniformization of quality factors has a negative impact on the efficiency of laser power extraction.

It is the purpose of the present invention to remedy these problems and to establish design guidelines for a new generation of high power laser generators that have such geometric and divergence characteristics, and average power at the output, that allow them to be used cost effectively for high speed material processing.

DESCRIPTION OF THE INVENTION

The present invention relates to high power industrial laser resonators, with improved efficiency of the lasing mechanism, for generating output beams with geometric and divergence characteristics and average power, usable for laser material processing, particularly for High-Speed-High-Power (HSHP), laser welding.

In particular, this invention sets conditions for beam characteristics, such that the laser beam could be usable directly from the output of the resonator without adding beam shaping optics, and such that a better optimization of the extraction efficiency of laser power can be achieved. A larger quality factor, enables a larger geometric dimension of the laser beam in the corresponding transverse direction, and therefore allows the use of more modes in this direction; consequently more power can be extracted from the cavity for the same excitation power and for the same active medium volume.

The laser resonator of the present invention, has a pumping mechanism that excites a volume of an active medium being in a cavity, the cavity having a cross section, referred herein as aperture or periphery, the active medium being between two mirrors, called end-mirrors, supported by mirror mounts. The resonator, apart the mirrors, may comprise other optics, such as diaphragms or masks having a hole through which the laser beam travels. The cross section of this hole defines the aperture of this particular optic, each of such optics having an aperture. The excited volume of active medium, the mirrors, the diaphragms/masks and all the different optical elements in the resonator cavity, all together yield a resultant aperture of the resonator. The aperture of the resonator is the cross section's shape of the output laser beam, whether the resonator is stable or unstable. It is the intent of this invention to achieve an optimum matching of the pumping mechanism excitation volume with the active medium aperture in order to optimize the efficiency of the laser, and to achieve proper laser beam geometric dimensions, divergence characteristics and average power such that it can be used for high-speed-high-power laser welding.

The laser resonator of the present invention is composed of two end-mirrors 1 & 2 separated by a geometrical distance Lg, and defining a cavity. These end-mirrors can be any suitable combination of flat, spherical, cylindrical, toroidal mirrors or else. These end-mirrors can be totally reflective or partially reflective. Additional reflective and transmissive optics can be added in the cavity between these two end-mirrors. The optical path of the laser beam between the two end-mirrors must not be a single straight segment, but can be a succession of adjacent straight segments, such as in ring lasers or such as in folded beams configurations in order to increase the optical path distance, L, between the two end-mirrors without substantially increasing the geometrical distance Lg between the two end-mirrors. In the resonator cavity, light is reflected back and forth between the two end-mirrors 1 & 2. The round-trip distance traveled by the laser light, between one reflection on end-mirror 1 and the next reflection on end-mirror 1, is equal to 2*L.

If the z-direction represents the propagation direction or axial direction, of the laser beam at the output of the resonator, then the transverse directions are the x-direction and the y-direction. The x-direction and z-direction define a transverse xz-plane, whereas the y-direction and z-direction define a transverse yz-plane. End-mirror 1 has radii of curvature R1x in a xz-plane and R1y in a yz-plane, whereas end-mirror 2 has radii of curvature R2x in a xz-plane and R2y in a yz-plane. Nothing prevents R1x to be equal to R1y such as if end-mirror 1 is a spherical mirror, and nothing prevents R2x to be equal to R2y such as if end-mirror 2 is a spherical mirror. If Rix is different from Riy, for i=1 or i=2, then end-mirror i is a toroidal mirror. If either Rix or Riy is infinite, then end-mirror i is a cylindrical mirror. If both Rix and Riy are infinite, then end-mirror i is a flat mirror. Each end-mirror can be by design, in each respective transverse xz-plane and yz-plane, concave (positive corresponding radius of curvature) or convex (negative corresponding radius of curvature). Each end-mirror's aperture, i.e. periphery, can be of any shape, including circular, elliptic, rectangular or any other non circular or oblong shape.

The active medium can be solid such as for example YAG rod, or a liquid or gas fluid such as a pure gas or a mixture of $CO_2$, $N_2$, He gases. This fluid may or may not be in circulation at more or less fast flow speed, either in a transverse direction, such as for transverse flow, or in the z-direction such as for axial flow. The pumping mechanism can be an electric discharge, or a high intensity flash light, or another laser, or a high frequency radiation wave excitation, or any other type of excitation-pumping mechanism. The pumping mechanism excites the molecules and atoms of active medium to higher quantum energy levels. Stimulated emission is amplified between end-mirrors 1 and 2. The laser beam is then extracted from the resonator cavity and used as a high energy beam which, in the case of high-speed-high-power welding is preferably at least 6 kW.

A resonator can be partly characterized by the following factors:

$$g1x=1-L/R1x,\ g2x=1-L/R2x,\ g1y=1-L/R1y,\ \text{and}\ g2y=1-L/R2y \quad (1)$$

In the xz-plane, the resonator is considered stable if:

$$0 \leq g1x*g2x \leq 1 \quad (2)$$

and unstable otherwise.
Similarly, in the yz-plane the resonator is considered stable if:

$$0 \leq g1y*g2y \leq 1 \quad 3)$$

and unstable otherwise.

The output power of the laser beam depends on the radii of curvatures of the end-mirrors, on the optical length of the cavity, on the coefficients of reflection of the end-mirrors, on the chemical composition and thermodynamic conditions of the active medium, on the intensity of the pumping mechanism, on the volume of active medium and on the different apertures of all the elements in the resonator cavity.

In such an output laser beam's cross-section, power distribution is not necessarily uniform. The power distribution is determined by the transverse-electromagnetic, TEMmn, modes present in the output laser beam. Each different combination of integer m and n represents one mode. The superimposition of modes in the two transverse directions results into corresponding specific intensity distribution profiles as well as beam divergences θx, respectively θy, of the laser beam of wavelength X, in the respective transverse xz-plane and yz-plane. These modes distribution and divergences can be quantitatively represented by a quality factor Kx in the xz-plane and another quality factor Ky in the yz-plane. Quality factors are real numbers larger or equal to 1. The higher is the order of a mode in a transverse plane, the larger its beam divergence will be and consequently, the larger the corresponding quality factor is expected to be. The output laser beam can then be characterized by Dx, Kx and Dy, Ky. These four factors are directly determined by the radii of curvature of the two end-mirrors, by the optical length of the cavity and by the resultant aperture of the cavity. The apertures of the two end mirrors and of all optical elements between them yield the resultant aperture of the resonator cavity. The resultant aperture of the cavity obviously determine the geometric dimensions Dx and Dy, immediately as the beam exits the resonator cavity. However, these geometric dimensions respectively control the value of quality factors Kx and Ky. When Dx, respectively Dy, increases, then Kx, respectively Ky, increases as well, at least proportionally when not quadratically.

In some cases, diaphragms or masks of specific apertures can be added to further adjust the characteristics Dx, Dy ,Kx and Ky of the output laser beam of the resonator cavity. It can be done in two different ways.

The first way is to add this mask-aperture intra-cavity, that is somewhere along the optical path between the two end-mirrors. This has for effect to mask some modes, in particular the high order modes, and actually prevent them from resonating in the cavity. It then forces the intra-cavity average power of the beam to be distributed among the remaining modes that are allowed to resonate. The average output power can suffer a reduction, due to the fact that the resultant aperture is further reduced compared to the cross section of the active medium volume. A reduction of the resultant aperture in any of the transverse directions directly leads to a reduction of the corresponding quality factors.

The second way is to add this mask-aperture extra-cavity at the output beam, that is nowhere between the two end-mirrors. This does alter neither the intra-cavity modes distribution nor the intra-cavity average power. Therefore, except in few specific configurations, no mode is being totally eliminated from the output beam, however, some modes might be represented only by the remaining part of them which is not filtered by the extra-cavity mask. The divergence of these altered modes does not change. This extra-cavity mask laser beam, can still exhibit the same modes with comparable resultant divergence and quality factors. However, a potentially significant part of the output laser beam power is lost by the mask-aperture, which contributes to heat this mask-aperture and therefore cooling is required. It is interesting to note that any optical element, including lenses and mirrors, placed extra-cavity, can alter the divergence of a beam, but generally do not alter the quality factors which are representative of the modes distribution in the laser beam.

The present invention emphasizes the advantage of having a laser resonator apparatus which preferably yields non-isotropic quality factors Kx, Ky. This means that Kx is substantially different from Ky, and preferably different by at least 25%, that is $|Kx-Ky|/(Kx+Ky) \geq 0.125$, where $|Kx-Ky|$ represents the absolute value of Kx–Ky. This feature yields substantially different beam divergences in the two transverse directions. If a laser resonator with the appropriate optics apertures yields an output beam with characteristics Dx=Dy and $|Kx-Ky|/(Kx+Ky) \geq 0.125$, such as a circular, however, non axissymetric beam, then by using a standard focusing optics such as, for example a parabolic mirror, this output beam will yield an oblong focus spot at just focus, which is a desired effect for some high-speed-high-power processing. Incidentally, it is interesting to note that in order to be considered axissymetric, a laser beam's cross-section needs to be substantially circular (Dx is substantially equal to Dy), and with substantially uniform quality factors (Kx is substantially equal to Ky).

Let us consider an embodiment, in which in the transverse yz-plane, the resonator can be considered unstable, that is, either $g1y^*g2y>1$ or $g1y^*g2y<0$, and end-mirror 2 having a smaller geometric dimension in the y-direction than end-mirror 1. The output laser beam will actually be extracted by diffraction losses in the unstable transverse yz-plane. The resultant aperture defined by geometric dimensions, i.e. apertures, of the end-mirrors, masks, enclosures, and other elements in the cavity, yields an output laser beam of geometric dimensions Dx and Dy. From these geometric dimensions Dx and Dy, a resultant set of quality factors Kx and Ky is respectively yield with values depending also on the radii of curvatures of each end-mirror and on the optical length of the cavity.

In order to optimize the amplification of the laser beam in the cavity and therefore the output power of the laser beam, diffraction losses need to be controlled carefully. For that reason, most industrial high power lasers should be operated near the lowest order mode in their unstable direction if any; that is Ky is preferably smaller than about two. In the xz-plane, the resonator can be considered as stable, that is, $0 \leq g1x^*g2x \leq 1$. In the case of a stable resonator in the xz-plane, Dx and Kx can be related by the following formula:

$$Kx=(\pi^*Dx^*Dx)/(\lambda^*Z_{Rx}) \quad (4)$$

with the Rayleigh range, $Z_{Rx}$, defined by:

$$Z_{Rx}=L^*[g1x^*g2x^*(1-g1x^*g2x)]^{1/2}/[g1x+g2x-2^*g1x^*g2x] \quad (5)$$

and the divergence θx of the laser beam in the xz-plane, at the output of the resonator, can be related to Dx and Kx as follow:

$$\theta x=2^*Kx^*\lambda/(\pi^*Dx)=2^*Dx/Z_{Rx} \quad (6)$$

Beam characteristics Kx, Dx and Ky, Dy can be measured experimentally for each laser beam. Equation (4) shows that when Dx increases, Kx increases as well proportionally to $Dx^2$. However, we will explain in the following section how large quality factors can be used for high speed processing.

Let the image of the xz-plane through a focusing optics coincide with the welding direction. This focusing optics could be a toroidal mirror with different focal lengths fx and fy in the two transverse directions, or a standard focusing mirror, such as a parabolic mirror of focal length f=fx=fy, or a combination of several mirrors and lenses, including cylindrical and elliptical ones. Then the dimensions of the focused beam's cross section at a distance z from the last focusing optics are given by:

$$L(z)=Lmin^*[1+(Dx^*(fx-z)/(Lmin^*fx))^2]^{1/2} \quad (7)$$

$$W(z)=Wmin^*[1+(Dx^*(fy-z)/(Wmin^*fy))^2]^{1/2} \quad (8)$$

where $$Lmin=4^*Kx^*\lambda^*fx/(\pi^*Dx) \text{ and } Wmin=4^*Ky^*\lambda^*fy/(\pi^*Dy) \quad (9)$$

For HSHP laser welding, the following relations are preferably satisfied:

$$1.5^*W(z) \leq L(z) \leq P^*10^5/(W(z)^*Pdensmin) \quad (10)$$

where L(z), W(z), Lmin, Wmin, fx , fy , Dx , Dy and λ are expressed in millimeters, P is the laser average output power expressed in kilowatt and Pdensmin is the minimum power density required to achieve keyhole mode welding expressed in Watt/$cm^2$. For most steel and aluminum alloys and certainly other alloys, Pdensmin is about $10^5$ Watt/$cm^2$ and can be even less if the material is preheated or simultaneously heated by an auxilliary heat source, such as induction, arc, TIG and MIG welders, or other known sources of heat. From the above equations, and with adequate focal lengths, the present invention specifies that the following two equations are preferably satisfied for the laser beam at the output of the laser resonator:

$$1.5 \leq (Kx^*Dy)/(Ky^*Dx) \text{ or } 1.5 \leq (Ky^*Dx)/(Kx^*Dy) \quad (11)$$

and $$Kx^*KY^*Dmax^*Dmax/(Dx^*Dy) \leq (P^*0.6 \text{ mm}^2 \cdot kW^{-1})/(\lambda^2*250) \quad (12)$$

where $$Dmax=Dx \text{ if } Dx \geq Dy \text{ and } Dmax=Dy \text{ if } Dy \geq Dx \quad (13)$$

which for CO2 laser yields ($\lambda$=0.0106 mm):

$$Kx^*Ky^*Dmax^*Dmax/(DX^*Dy) \leq P^*21.3 \; kW^{-1} \quad (14)$$

Let us assume that Dx>Dy and therefore Dmax=Dx i.e. Dx represents the longitudinal dimension of the laser beam cross-section at the output of the resonator cavity and a large value for Kx is chosen. Equation (12) yields then:

$$Kx^*Dx<P^*Dy^*0.6 \text{ mm}^2 \cdot kW^{-1}/(\lambda^2*250*Ky) \quad (15)$$

or $$Dx/Dy<P^*0.6 \text{ mm}^2 \cdot kW^{-1}/(\lambda^2*250*Kx^*Ky) \quad (16)$$

It follows in the above assumption, that for industrial high power lasers for welding, and particularly for gas lasers such as CO2 lasers, a small value of Ky is desired. This yields the optimization requirement: Dy<25 mm and Ky<10, and preferably Ky<5. This requirement yields the following inequality:

$$Kx^*Dx<P^*0.6 \text{ mm}^2 \cdot kW^{-1}/(\lambda^2*50) \quad (17)$$

In all the equations, Dmax, Dx, Dy and $\lambda$ are expressed in millimeters, and P is expressed in kiloWatt.

Objects, features and advantages of this invention are to provide a high power laser resonator apparatus which outputs a non-axissymetric laser beam of high average power, to be used for laser material processing at high speed and high power; improves the efficiency of the energy extraction in the cavity; produces a non-axissymetric output laser beam with specific geometric dimensions and corresponding quality factors, in two transverse directions perpendicular to the direction of propagation of the laser beam; enables usage of this non-axissymetric laser beam for material processing such as surface treatment, cutting, welding, or else, without the need for additional, laser power consuming and expensive beam shaping units; enables usage of this non-axissymetric laser beam for high-speed-high-power laser welding of metal sheets in a keyhole mode, without the need for additional, laser power consuming and expensive beam shaping units; enables usage of this non-axissymetric laser beam for high-speed-high-power laser welding of metal sheets in a keyhole mode, using standard parabolic, spherical and cylindrical focusing mirrors or standard focusing lenses.

BRIEF DESCRIPTION OF THE DRAWINGS

These and other objects, features and advantages of this invention will become apparent from the following description of the preferred embodiments, appended claims, and accompanying drawings in which:

DESCRIPTION OF THE PREFERRED EMBODIMENTS

Figure 1:
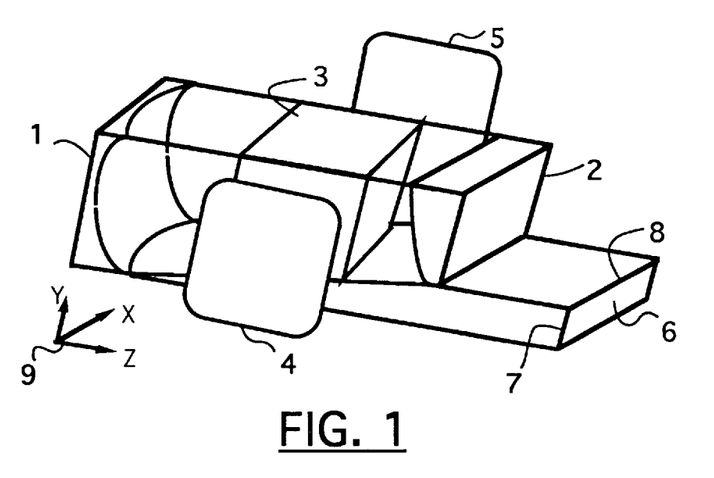
FIG. 1 is a perspective view of a preferred embodiment of the present invention.

FIG. 1 illustrates a schematic view of the preferred embodiment of this invention, according to which the laser resonator is a hybrid resonator. The laser resonator is composed of two end-mirrors 1 & 2 separated by a geometrical distance Lg, and defining a cavity. The optical path between the two end-mirrors must not be a single straight line, but can be a succession of folded straight segments, such as to increase the optical path distance, L, between the two end-mirrors. According to a variation of this embodiment, and following a technique known in the art, the resonator cavity comprises one or more folding mirrors that force the laser light beam to follow a succession of of folded segments, such as to increase the optical path distance, L, between the two end-mirrors. This technique yields an optical length many times greater than the gometrical distance, Lg, between the two end-mirrors. In the cavity, light rays are reflected back and forth between the two end-mirrors 1 & 2, until part of this light is lost by diffraction and exits the cavity from the aperture left by the smaller end-mirror 2, thus yielding the output laser beam 6. The distance traveled by light, between one reflection on end-mirror 1 and the next reflection on end-mirror 1, is substantially equal to 2*L. The indicator 9 indicates the three orthogonal directions, x-, y-, and z-direction, with the z-direction representing the propagation direction of the laser beam, or axial direction, at the output of the resonator; in FIG. 1 the z-direction coincides with the resonator axis as well. The cross-section of the output laser beam 6 has a transverse side 8 characterized by a geometrical dimension Dx and a quality factor Kx, whereas its transverse side 7 is characterized by a geometrical dimension Dy and a quality factor Ky.

The x-direction and z-direction define a transverse xz-plane, whereas the y-direction and z-direction define a transverse yz-plane. End-mirror 1 has radii of curvature R1x=20 m, in a xz-plane and R1y=80 m in a yz-plane, whereas end-mirror 2 has radii of curvature R2x=−8 m in a xz-plane and R2y=−20 m in a yz-plane. Thus end-mirror 1 is a concave (positive radius of curvature) and end-mirror 2 a convex mirror (negative radius of curvature). End-mirror 2 having a smaller geometric dimension in the y-direction than end-mirror 1, the output laser beam is actually extracted by diffraction losses in the unstable transverse yz-plane.

The active medium 3 is a mixture of about 70% CO2, 15% N2 and 15% He, flowing transversely. Other active media known in the field may be used. The pumping mechanism 4, 5 is a DC electric discharge excitation, but any other known means for exciting the active medium can be used. The wavelength of the output laser radiation is $\lambda$=10.6 $\mu$m. This resonator is stable in the x-direction and unstable in the y-direction. Both end-mirrors 1, 2 are substantially totally reflective.

The cross section of output laser beam 6 of the present embodiment is of rectangular shape. The resultant aperture of this cavity is designed to yield geometric dimensions Dx=40 mm and Dy=20 mm for the output laser beam. In the stable direction, it yields Kx=20. In the unstable direction, it is the intent to be close to diffraction limit, i.e., the small value of Dy is designed to yield Ky equal to about 2.

According to this invention, the intensity and efficiency of the pumping mechanism as well as the volume of excited active medium as seen though the apertures of both end-mirrors are preferably adjusted to yield an average laser output power, P, of at least about 9.35 kW. One obtains then 21.3P=200 and Kx*Ky*Dx/Dy=114 and equation (14) is satisfied. Whereas Kx*Dy/(Ky*Dx)=3.5 and equation (11) is satisfied.

In order to optimize the amplification of the laser beam in the cavity and therefore the output power of the laser beam, diffraction losses need to be controlled carefully. For that reason, the resonator is operated near the lowest order mode in its unstable direction; that is Ky is preferably equal to or smaller than about two. Still in FIG. 1, in the xz-plane, the resonator can be considered as stable, that is, $0 \leq g1x*g2x \leq 1$.

Figure 2:
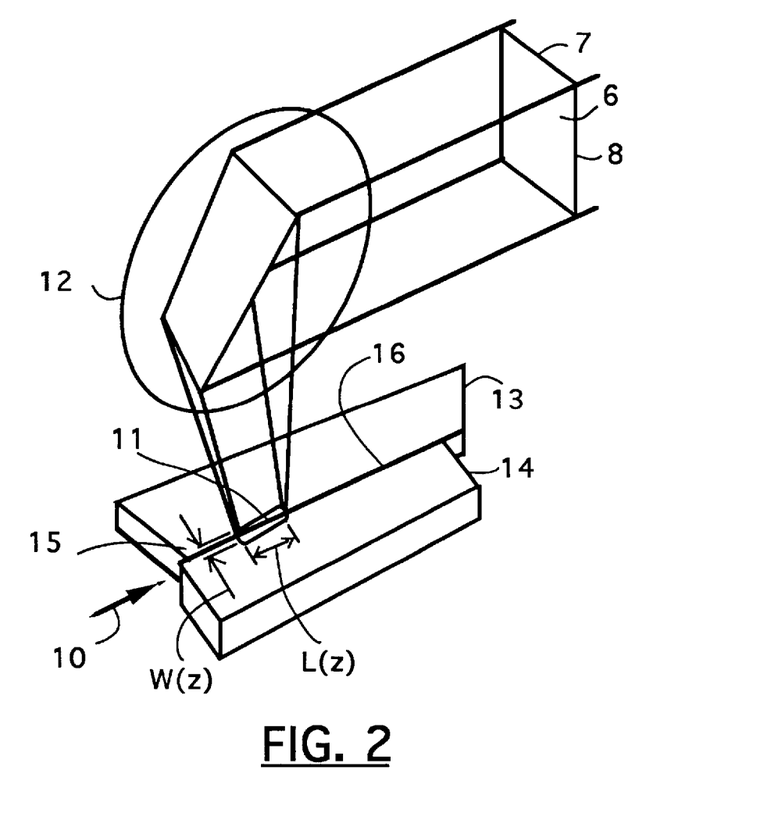
FIG. 2 is a schematic view of a laser beam of the invention during welding.

As shown in FIG. 2, a sheet metal 13 is positioned in close proximity to another sheet metal 14, so as to form a workpiece 15, and so as to form a weld line 16. The output laser beam 6 is incident on a standard parabolic focusing mirror 12. This results into an oblong focused beam spot 11 on workpiece 15. Oblong spot 11 has a longitudinal dimension L(z) and a width W(z), both being dependent on the distance z from focusing mirror 12 to workpiece 15. The oblong spot 11 is trained along the weld line 16 at a speed, V, of preferably at least 2 m/min and remains oriented such that its longitudinal axis is substantially parallele to the welding direction indicated by the direction indicator 10, and more generally substantially tangeant to weld line 16. Oblong spot 11 on workpiece 15 has preferably a power density greater than the minimum power density, Pdensmin, necessary to achieve keyhole welding of sheets 13, 14. Although FIG. 2 illustrates a welding process in a butt-joint configuration, other configurations such as lap joint and others can benefit from this invention. Moreover, surface treatment, cutting and other material processing applications can also benefit from this invention.

According to a second embodiment, the resonator is equally a hybrid laser resonator apparatus of the type illustrated in FIG. 1. The active medium 3 is also a mixture of about 70% CO2, 15% N2 and 15% He, flowing transversely. The pumping mechanism 4, 5 is a DC electric discharge excitation. The wavelength of the laser radiation is $\lambda = 10.6$ μm. The two end-mirrors 1, 2 are cylindrical and have radii R1x=20 m, R2x is infinite, R1y is infinite and R2y=−40 m with an optical length L=12 m. This resonator is stable in the x-direction and unstable in the y-direction. Both end-mirrors are substantially totally reflective. The resultant aperture of this cavity is designed to yield geometric dimensions Dx=40 mm and Dy=20 mm for the output laser beam. In the stable direction, it yields Kx=50. In the unstable direction, it is the intent to be close to diffraction limit, i.e., the small value of Dy is designed to yield Ky equal to about 2. According to this invention, the intensity and efficiency of the pumping mechanism as well as the volume of excited active medium as seen though the apertures of both end-mirrors are preferably adjusted to yield an average laser output power, P, of at least about 9.5 kW. One obtains then 21.3P=202 and Kx*Ky*Dx/Dy=200 and equation (14) is satisfied. Whereas Kx*Dy/(Ky*Dx)=12.5 and equation (11) is satisfied.

Figure 3:
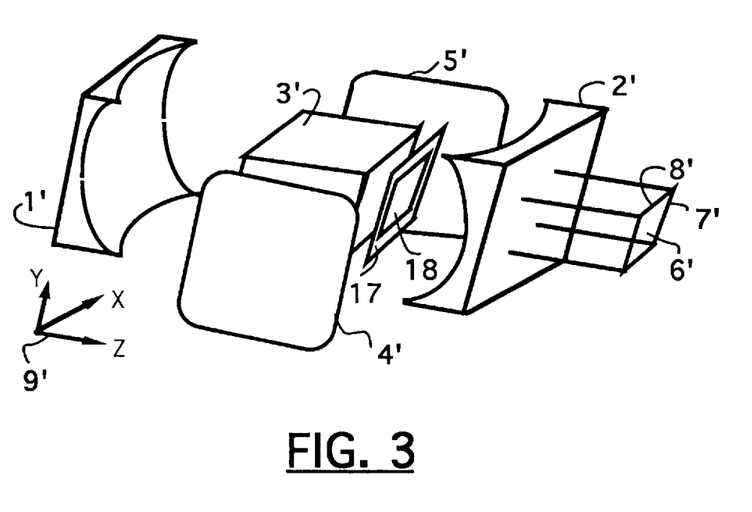
FIG. 3 is a perspective view of another embodiment of the present invention.

FIG. 3 illustrates a third embodiment of the present invention, according to which end-mirror 1' is opaque and end-mirror 2' semi-transparent. The resonator in FIG. 3 can be considered as stable in both x-direction and y-direction. End-mirror 2', the output coupler mirror, is at least 80% reflective. The usable output laser beam 6' is the part of the laser radiation which is partially transmitted out through end-mirror 2'. For a certain power level P and a laser beam wavelength $\lambda$, equations (11) and (12) are preferably satisfied. End-mirrors 1' and 2' could be any combination of flat, spherical, cylindrical or toroidal mirrors, with any type of suitable aperture. The resonator of the present embodiment comprises a mask 17 placed inside the cavity, between the two end-mirrors, 1' and 2'. The mask 17 has an aperture 18 contributing to the resultant resonator cavity aperture which defines the output beam 6'. Output beam 6' has a cross-section whose transverse side 8' is characterized by a geometrical dimension Dx and a quality factor Kx, whereas transverse side 7' is characterized by a geometrical dimension Dy and a quality factor Ky.

Figure 4:
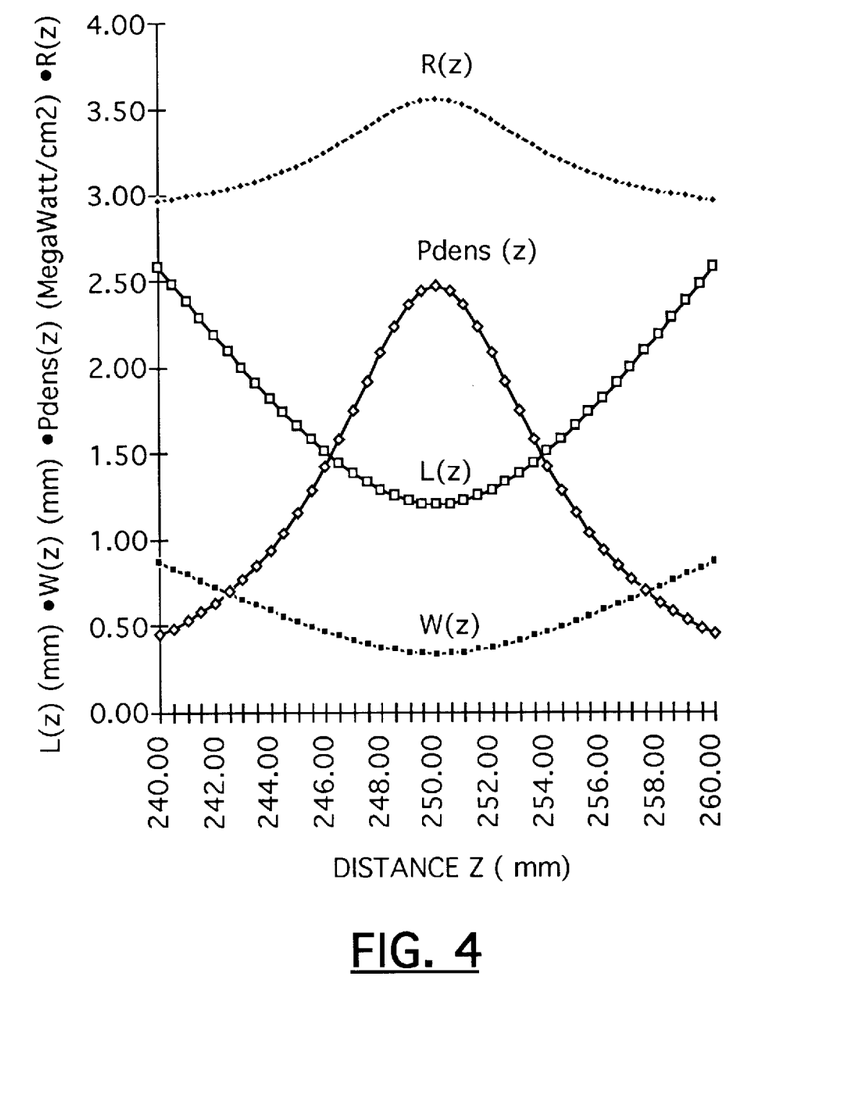
FIG. 4 is a graph showing variations of the focus spot dimensions, aspect ratio and average power density as a function of the distance z between the focusing optics and the workpiece for a particular material processing configuration.

FIG. 4 illustrates the variations of four parameters of the output beam 6 of the first embodiment of the present invention, as a function of distance z. L(z) and W(z) are the dimensions of focus spot 11 on the workpiece 15, R(z)=L(z)/W(z) is the aspect ratio of focus spot 11, and Pdens(z)=P/(L(z)*W(z)) is the approximated resultant average power density of focus spot 11 on workpiece 15, where P is the output power of the resonator, P=10 kW. The output laser beam characteristics are Dx=57 mm, Kx=20, and Dy=20 mm, Ky=2 with a laser beam wavelength of $\lambda = 10.6$ μm. The standard polished copper parabolic focusing mirror 12 has a focal length f=250 mm. From this graph, if Pdensmin=1 MegaWatt/cm2 is the minimum power density required for keyhole welding, then the chosen distance z is preferably chosen anywhere between z=244.5 mm and z=255.5 mm. In this particular example, one obtains Lmin=1.20 mm and Wmin=0.34 mm.

What is claimed is:

1. A laser resonator apparatus comprising two end mirrors separated by a geometrical distance Lg and an optical length L, the optical length L being equal to the distance travelled by light in a one way trip from one end-mirror to the other end-mirror, an active medium between the two end mirrors, a pumping mechanism that excites atoms and molecules of the active medium and stimulates emission of laser radiation between the end-mirrors, such that an output laser beam of wavelength, $\lambda$, and of average output power, P, of at least 3 kW is produced from the resonator, a resultant aperture defining the output laser beam's cross section dimensions Dx and Dy in two transverse x-direction and y-direction, perpendicular to the z-direction of propagation of the laser beam immediately as it exits the resonator, the x-direction and z-direction defining the xz-plane, and the y-direction and z-direction defining the yz-plane, and respective quality factors Kx and Ky in the two transverse x-direction and y-direction, characterized in that the beam characteristics Dx, Dy, Kx, Ky satisfy the following:

$$1.5 \leq (Kx*Dy)/(Ky*Dx)$$

or $$1.5 \leq (Ky*Dx)/(Kx*Dy)$$

and $$|Kx-Ky|/(Kx+Ky) \geq 0.125.$$

2. A laser resonator according to claim 1 wherein the output beam characteristics satisfy $$Kx^*Ky^*Dmax^*Dmax/D(x^*Dy) \leq (P^*0.6 \text{ mm}^2 \cdot \text{kW}^{-1})/(\lambda^2 * 250)$$

where Dmax=Dx if Dx≧Dy and Dmax=Dy if Dy≧Dx.

3. A laser resonator according to claim 1 in which additional transmissive and reflective optical elements are placed in the resonator, between the end-mirrors.

4. A laser resonator according to claim 1 wherein the output power, P, is at least 6 kW.

5. A laser resonator according to claim 1 wherein the resonator is stable in the x-direction and unstable in the y-direction.

6. A laser resonator according to claim 1 wherein the output beam characteristics satisfy:

$$Dx \geq Dy \text{ and: } Kx^*Dx \leq (P^*0.6 \text{ mm}^2 \cdot kW^{-1})/(\lambda^2 * 50).$$

7. A laser resonator of claim 1 wherein at least one of the end-mirrors is a cylindrical mirror.

8. A laser resonator comprising
two end mirrors separated by a geometrical distance Lg and an optical length L, the optical length L being equal to the distance travelled by light in a one way trip from one end-mirror to the other end-mirror, an active medium between the two end mirrors, a pumping mechanism that excites atoms and molecules of the active medium and stimulates emission of laser radiation between the end-mirrors, such that an output laser beam of wavelength, λ, and of average output power, P, of at least 3 kW is produced from the resonator, a resultant aperture defining the output laser beam's cross section dimensions Dx and Dy in two transverse x-direction and y-direction, perpendicular to the z-direction of propagation of the laser beam immediately as it exits the resonator, the x-direction and z-direction defining the xz-plane, and the y-direction and z-direction defining the yz-plane, and respective quality factors Kx and Ky in the two transverse x-direction and y-direction, characterized in that the beam characteristics Dx, Dy, Kx, Ky satisfy the following:

$$1.5 \leq Kx^*Dy/(Ky^*Dx) \text{ or } 1.5 \leq Ky^*Dx/(Kx^*Dy)$$

where Dx≧Dy and: Kx*Dx≦(P*0.6 mm².kW⁻¹) (λ²*50).

9. A laser resonator according to claim 8 wherein the resonator is stable in the x-direction and unstable in the y-direction.

10. A laser resonator according to claim 8 wherein the output power, P, is at least 6 kW.

11. A laser resonator according to claim 8 wherein the quality factors satisfy:

$$|Kx-Ky|/(Kx+Ky) \geq 0.125.$$

12. A method of welding using a high energy density radiation beam produced by a laser resonator apparatus, the laser resonator apparatus comprising:

two end mirrors separated by a geometrical distance Lg and an optical length L, the optical length L being equal to the distance travelled by light in a one way trip from one end-mirror to the other end-mirror, an active medium between the two end mirrors, a pumping mechanism that excites atoms and molecules of the active medium and stimulates emission of laser radiation between the end-mirrors, such that an output laser beam of wavelength, λ, and of average output power, P, of at least 3 kW is produced from the resonator, a resultant aperture defining the output laser beam's cross section dimensions Dx and Dy in two transverse x-direction and y-direction, perpendicular to the z-direction of propagation of the laser beam immediately as it exits the resonator, the x-direction and z-direction defining the xz-plane, and the y-direction and z-direction defining the yz-plane, and respective quality factors Kx and Ky in the two transverse x-direction and y-direction, characterized in that the beam characteristics Dx, Dy, Kx, Ky satisfy the following:

$$1.5 \geq Kx^*Dy/(Ky^*Dx) \text{ or } 1.5 \leq Ky^*Dx/(Kx^*Dy)$$

$$|Kx-Ky|/(Kx+Ky) \leq 0.125.$$

13. A method of welding according to claim 12 wherein the laser resonator's output beam characteristics satisfy:

$$Kx^*KY^*Dmax^*Dmax/(Dx^*Dy) \leq (P^*0.6 \text{ mm}^2 \cdot kW^{-1})/(\lambda^2*250)$$

where Dmax=Dx if Dx≧Dy and Dmax=Dy if Dy≧Dx.

14. A method of welding according to claim 12 wherein the output power, P, is at least 6 kW.

15. A method of welding according to claim 12 wherein the laser resonator is stable in the x-direction and unstable in the y-direction.

16. A method of welding according to claim 12 wherein a pair of sheets to be welded together are provided, with one of the sheets positioned in close proximity to the other sheet so as to define a weld line, and a focusing optics system placed at a distance z from the sheets, and capable of focusing the laser beam into an oblong spot on at least one of the sheets, this oblong spot having a width, W(z), and along a longitudinal axis, a longitudinal length, L(z), is trained onto at least one of the sheets to weld the sheets by moving the beam relative to the sheets along the weld line at a welding speed, V, of at least two meters per minute, wherein the power density of the oblong spot, approximated by P/(W(z)*L(z)), is sufficient to achieve deep penetration keyhole mode welding, and wherein the longitudinal axis of the oblong spot is substancially tangent to the weld line.

17. A method of claim 16 wherein L(z) and W(z) satisfy:

$$1.5^*W(z) \leq L(z) \leq (P^*10^5)/(W(z) * \text{Pdensmin})$$

wherein Pdensmin is the minimum average power density of the oblong spot necessary to achieve formation of deep penetration keyhole welding of said pair of sheets.

18. A method of claim 17 wherein Pdensmin is at least equal to $10^5$ Watt/cm².

19. A method of welding according to claim 16 wherein the focusing optics system comprises a parabolic focusing mirror.

* * * * *